United States Patent
Furuhashi

(10) Patent No.: US 6,192,880 B1
(45) Date of Patent: Feb. 27, 2001

(54) LIQUID HEATING APPARATUS

(75) Inventor: Toshio Furuhashi, Shizuoka-ken (JP)

(73) Assignee: Eiken Industries Co., Ltd. (JP)

( * ) Notice: Subject to any disclaimer, the term of this patent is extended or adjusted under 35 U.S.C. 154(b) by 0 days.

(21) Appl. No.: 09/421,047

(22) Filed: Oct. 19, 1999

(30) Foreign Application Priority Data

Oct. 19, 1998 (JP) .................................................. 10-296613

(51) Int. Cl.[7] .................................................. A47J 27/00

(52) U.S. Cl. .................................... 126/391.1; 126/357.1; 99/403

(58) Field of Search .............................. 126/378.1, 390.1, 126/357.1, 391.1, 343.5 R, 373.1; 99/403, 408; 165/183, 146, 179

(56) References Cited

U.S. PATENT DOCUMENTS

| | | |
|---|---|---|
| 1,630,309 | 5/1927 | Pitman . |
| 2,149,696 * | 3/1939 | Holmes .................. 165/179 |
| 2,290,784 | 7/1942 | Turpin . |
| 2,431,753 * | 12/1947 | Holderle et al. ............ 126/391 |
| 2,483,454 * | 10/1949 | Brown, Jr. ............... 165/179 |
| 2,569,112 | 9/1951 | Miller et al. . |
| 3,217,633 | 11/1965 | Anetsberger . |
| 3,760,793 | 9/1973 | Anetsberger et al. . |
| 3,769,959 | 11/1973 | Parker . |
| 3,990,433 | 11/1976 | Keating . |
| 4,214,627 | 7/1980 | Kunkel . |
| 4,397,299 | 8/1983 | Taylor et al. . |
| 4,602,612 | 7/1986 | Schwizer . |
| 4,628,903 | 12/1986 | Farmsworth et al. . |
| 4,690,127 * | 9/1987 | Sank ....................... 126/391 |
| 4,848,318 | 7/1989 | Brewer . |
| 4,858,592 | 8/1989 | Hayek et al. . |
| 6,044,839 | 4/2000 | Furuhashi . |

FOREIGN PATENT DOCUMENTS

| | | |
|---|---|---|
| 442 655 | 1/1968 | (CH) . |
| 0 125 750 | 11/1984 | (EP) . |
| 0 159 750 | 10/1985 | (EP) . |
| 1 405 410 | 5/1965 | (FR) . |
| 2504001 | 10/1982 | (FR) . |
| 2098856 | 12/1982 | (GB) . |
| 56-37496 | 9/1981 | (JP) . |
| 57-92643 | 9/1982 | (JP) . |
| 61-45046 | 3/1986 | (JP) . |
| 61-64837 | 5/1986 | (JP) . |
| 61-52152 | 8/1986 | (JP) . |
| 3-114136 | 11/1991 | (JP) . |

OTHER PUBLICATIONS

U.S. application No. 06/734,284, Farnsworth et al. Dec. 1986.

* cited by examiner

Primary Examiner—James C. Yeung
(74) Attorney, Agent, or Firm—Harness, Dickey & Pierce, P.L.C.

(57) ABSTRACT

The present invention provides a liquid heating apparatus which can obtain a sufficient heat efficiency by making large a heating surface area by a combustion gas flowing through an exhaust pipe located in a liquid bath.

In a liquid heating apparatus which includes: a liquid bath; a combustion chamber which is provided with a burner, and is formed at one side on a lower portion of the liquid bath; and an exhaust pipe which is located in a substantially horizontal state at an intermediate portion of the liquid bath, and extends from one side of the liquid bath toward the other side thereof, and which heats a liquid in the liquid bath bypassing a combustion gas generated in the combustion chamber into the exhaust pipe, a fin is integrally located on an inner surface of the exhaust pipe along a longitudinal direction thereof. The fin has a heating surface area which is set in accordance with a temperature gradient in a longitudinal direction of the exhaust pipe, and is located on only upper portion side on an inner surface of the exhaust pipe.

5 Claims, 6 Drawing Sheets

PRIOR ART

LIQUID HEATING APPARATUS

BACKGROUND OF THE INVENTION

1. Field of the Invention

The present invention relates to a liquid heating apparatus such as a fryer, a noodle boiling machine or the like, and in particular, to a liquid heating apparatus which can effectively heat a liquid in a liquid bath.

2. Description of the Related Art

Conventionally, a fryer used as this type of liquid heating apparatus has been disclosed in Unexamined Utility Model Publication (Kokai) No. 61-52152, for example. As shown in FIG. 9 and FIG. 10, the fryer 1 has a liquid bath 3 which is located on an upper portion of a main body 2, and a plurality of exhaust pipes 4 (four in FIG. 9) are arranged in a horizontal state at the substantially central position in a height direction of the liquid bath 3. These exhaust pipes extend penetratingly from one end side 3a (front side of the main body 2) toward the other side 3b (rear side of the main body 2). Each exhaust pipe 4 is provided with connective pipes 5a and 5b which are inclined right and left and alternately extend in a shape of cross in the exhaust pipe 4, at a predetermined interval in a longitudinal direction thereof.

Moreover, a lower portion on one end side 3a of the liquid bath 3 is formed with a combustion chamber 9 which comprises a horizontal wall 6, a vertical wall 7 and a cover 8 downwardly extending from the front end of the horizontal wall 6, and a gas burner 10 is arranged in the combustion chamber 9. A bottom portion of the liquid bath 3 on the lower portion of the exhaust pipe 4, is inclined so as to become low on its forward side, and a portion just under the bottom portion is provided with a drain cock 11, and further, a waste oil box 12 is arranged at a downward position of the drain cock 11 in the man body 2.

In the fryer 1, when the combustion chamber 9 is filled with a combustion gas generated by a combustion of the gas burner 10, the horizontal wall 6 of the liquid bath 3 is directly heated so as to heat an oil 13 in the liquid bath 3. Then, the combustion gas comes into the exhaust pipe 4, and flows through the interior of exhaust pipe 4 as shown by an arrow A, and thus, is discharged from a discharge cylinder 14 to the outside.

In this case, four exhaust pipes 4 are arranged in a horizontal state; therefore, the oil 13 in the liquid bath 3 is heated by the combustion gas flowing through the exhaust pipe 4 while being heated by the connective pipes 5a and 5b located in the exhaust pipe 4. Whereby an upper portion of the liquid bath 3 from the exhaust pipe 4 becomes a high temperature section; on the other hand, a lower portion of the liquid bath 3 from the exhaust pipe 4 becomes a low temperature section. Further, a food is deep-fried in the oil 13 of the high temperature section while being prevented from falling into the low temperature section by a net 15 arranged on the upper portion of the exhaust pipe 4.

However, this fryer 1 has a construction in which four cylindrical exhaust pipes 4 are arranged at the lower portion of the liquid bath 3, and the exhaust pipe 4 is provided with the totaled six connective pipes 5a and 5b arranged like a shape of cross. For this reason, a heating surface area of the combustion gas flowing through the exhaust pipe 4 is small with respect to the exhaust pipe 4; as a result, it is impossible to effectively the oil 13 of the liquid bath 3 by means of the gas burner 10. Thus, the aforesaid fryer 1 has a problem that it is difficult to obtain a sufficient heat efficiency.

Moreover, a temperature of the combustion gas flowing through the exhaust pipe 4 becomes highest at an inlet side on the combustion chamber 9 side of the exhaust pipe 4, and becomes lowest at an outlet side on the discharge cylinder 14 side. In the above fryer 1, the totaled six connective pipes 5a and 5b are merely extended in a diametrical direction of the exhaust pipe 4, and are arranged along the longitudinal direction thereof at a substantially constant interval. For this reason, it is difficult to obtain a heat conduction along a temperature gradient of the combustion gas flowing through the exhaust pipe 4; as a result, there is a problem that a temperature difference is easy to be generate in the oil 13 in the longitudinal direction of the liquid bath 3. In addition, a pressure loss is easy to be generated in an exhaust pipe 4 section forming a heat exchange section, and an outer dimension of the exhaust pipe section becomes large; for this reason, there is a problem that a cleaning performance is worse.

SUMMARY OF THE INVENTION

The present invention has been made taking the aforesaid problems in the prior art into consideration. An object of the invention defined in the first aspect (claim 1) is to provide a liquid heating apparatus which can obtain a sufficient heat efficiency by making large a heating surface area by a combustion gas flowing through an exhaust pipe located in a liquid bath.

Further, in addition to the object of the invention defined in the first aspect, an object of the invention defined in the second aspect (claim 2) is to provide a liquid heating apparatus which can obtain a sufficient heat efficiency, and can uniformly heat a liquid in the liquid bath.

Further, in addition to the object of the invention defined in the first or second aspect, an object of the invention defined in the third aspect (claim 3) is to provide a liquid heating apparatus which can simplify a construction of the exhaust pipe.

Further, in addition to the object of the invention defined in the first to third aspects, an object of the invention defined in the fourth or fifth aspect (claim 4 or 5) is to provide a liquid heating apparatus which is constructed in a manner that the exhaust pipe is readily manufactured.

To achieve the above objects, the invention defined in the first aspect provides a liquid heating apparatus including: a liquid bath; a combustion chamber which is provided with a burner, and is formed at one side on a lower portion of the liquid bath; and an exhaust pipe which is located in a substantially horizontal state at an intermediate portion of the liquid bath, and extends from one side of the liquid bath toward the other side thereof, and heating a liquid in the liquid bath by passing a combustion gas generated in the combustion chamber into the exhaust pipe, wherein a fin is integrally located on an inner surface of the exhaust pipe along a longitudinal direction thereof.

With the above construction, the combustion gas generated by the combustion of the burner comes into the exhaust pipe from the combustion chamber, and then, flows through the exhaust pipe so as to heat the fins which are integrally fixed to the inner surface of the exhaust pipe during the passage of the combustion gas. The fins serve to make large a heating surface area of the combustion gas with respect to the exhaust pipe, and therefore, the heat of the fin is transferred to the exhaust pipe so that a liquid existing around the upper portion of the exhaust pipe is effectively heated; as a result, a sufficient heating efficiency.

Further, the invention defined in the second aspect provides the liquid heating apparatus wherein the fin has a heating surface area which is set in accordance with a temperature gradient in a longitudinal direction of the exhaust pipe. With the above construction, for example, the height of the fin is made lower at an inlet side of the exhaust pipe where the combustion gas temperature is high, and is made higher at an outlet side of the exhaust pipe where the combustion gas temperature is low. Whereby a heating surface area of the fin is set in accordance with a temperature gradient, so that a heat (temperature) of the combustion gas can be further effectively transferred to the exhaust pipe via the fin. As a result, a sufficient heating efficiency can be obtained.

Further, the invention defined in the third aspect provides the liquid heating apparatus wherein the fin is located on only upper portion side on an inner surface of the exhaust pipe. With the construction, the fin is located on only upper side of the inner surface of the exhaust pipe which is a high temperature section side of the liquid bath. Therefore, this serves to reduce the number of fins, and to simplify a construction of the exhaust pipe.

Further, the invention defined in the fourth aspect provides the liquid heating apparatus wherein the fin is formed into a U-letter shape in its cross section, and is fixed to the inner surface of the exhaust pipe so that a fixture portion of the fin has a predetermined interval. The invention defined in the fifth aspect provides the liquid heating apparatus wherein the fin is formed into an L-letter shape in its cross section, and a fixture portion of the fin is fixed to the inner surface of the exhaust pipe. With the above construction, the U-letter or L-letter shaped fin in its cross section is fixed to a flat-like plate so that the fixture portion of the fin has a predetermined interval, and then, the plate is bent into a circular shape. When bending the plate, the fixture portion of the fin is fixed to the plate at a predetermined interval, and therefore, it is possible to preferably bent the plate without interfering with the fin. Thus, the exhaust pipe is manufactured by fixing end portions of the bent plate by welding or the like, so that the exhaust pipe can be readily manufactured.

DETAILED DESCRIPTION OF THE PREFERRED EMBODIMENTS

One embodiment of the present invention will be described below with reference to the accompanying drawings.

Figure 1:
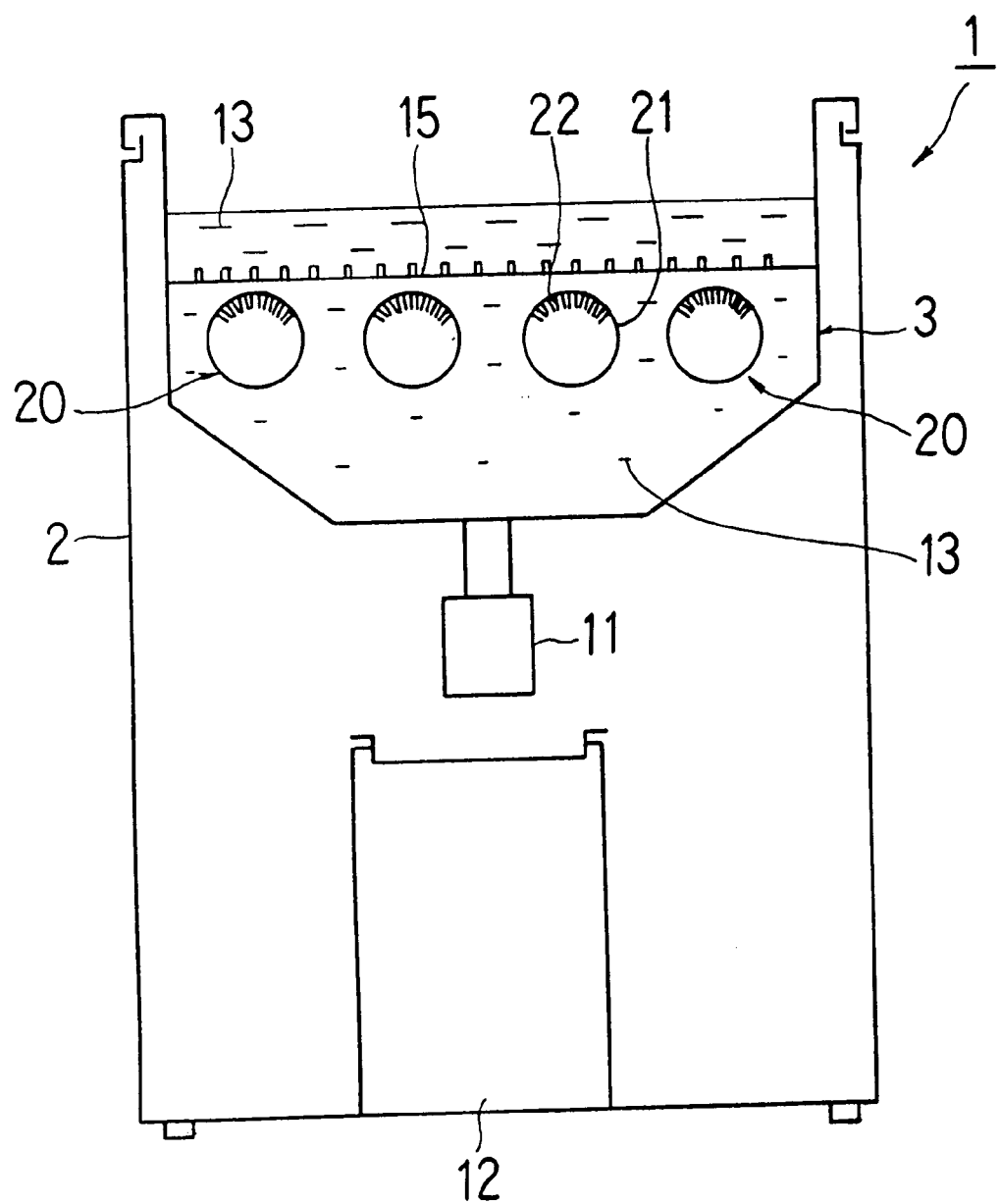
FIG. 1 is a sectional front view schematically showing a liquid heating apparatus according to one embodiment.
Figure 2:
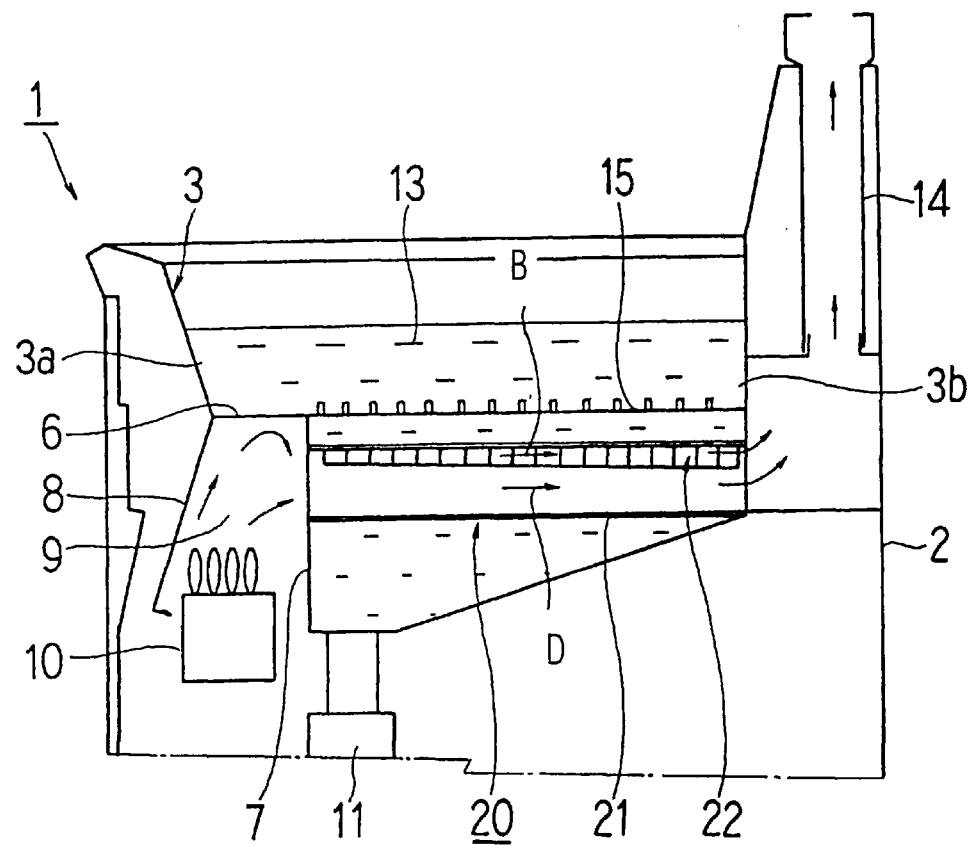
FIG. 2 is a sectional side view schematically showing principal parts of the liquid heating apparatus.
Figure 3:
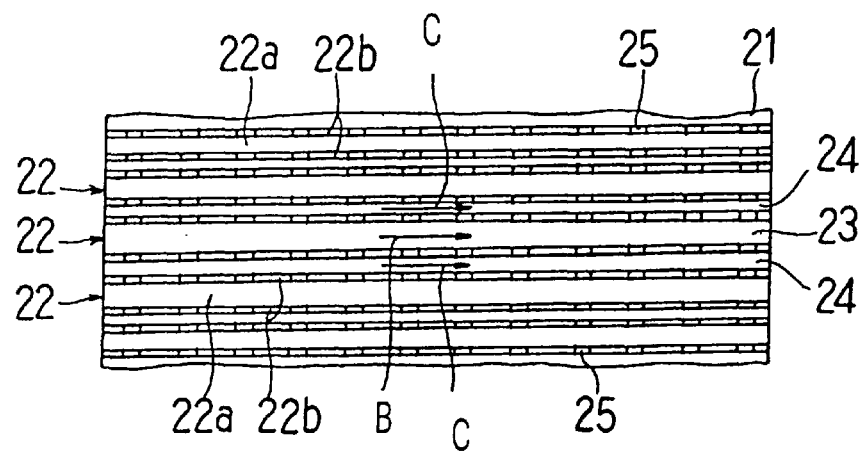
FIG. 3 is a view showing interior principal parts of an exhaust pipe of the liquid heating apparatus.
Figure 4:
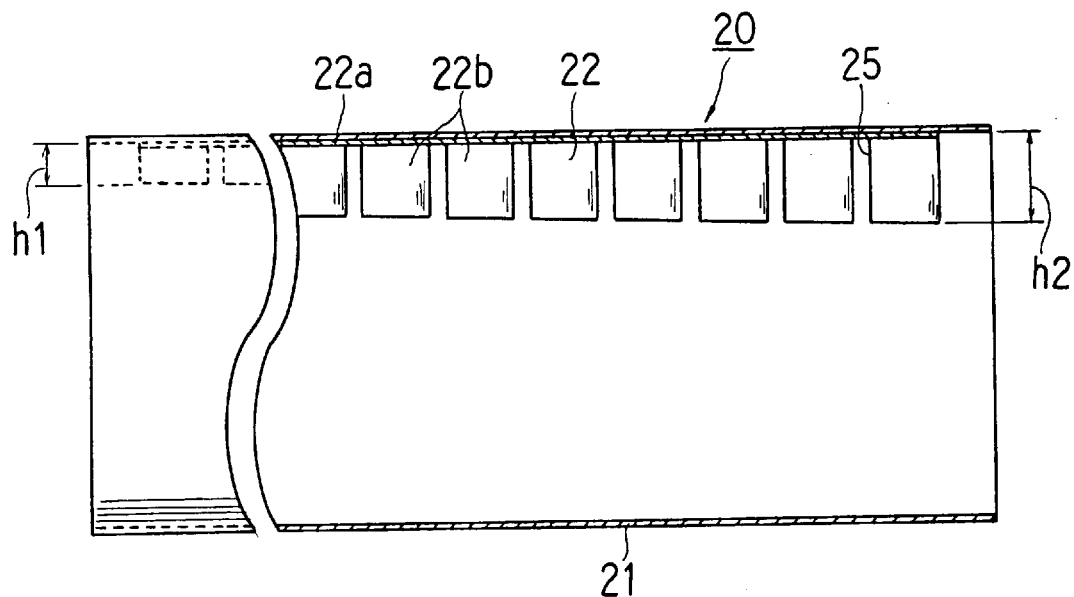
FIG. 4 is a side view in partly section showing the exhaust pipe.
Figure 5:
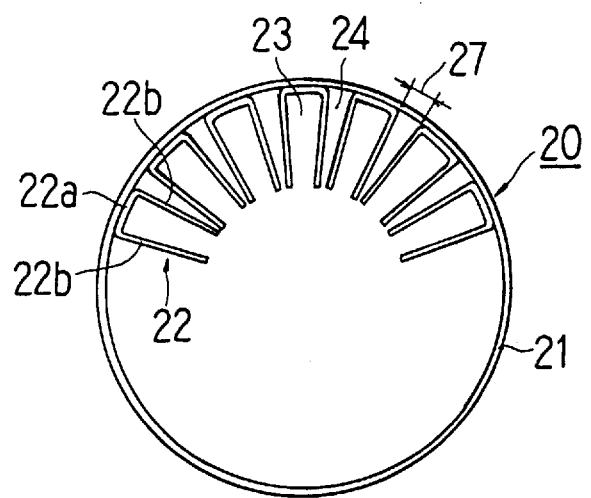
FIG. 5 is a front view showing the exhaust pipe.
Figure 6:
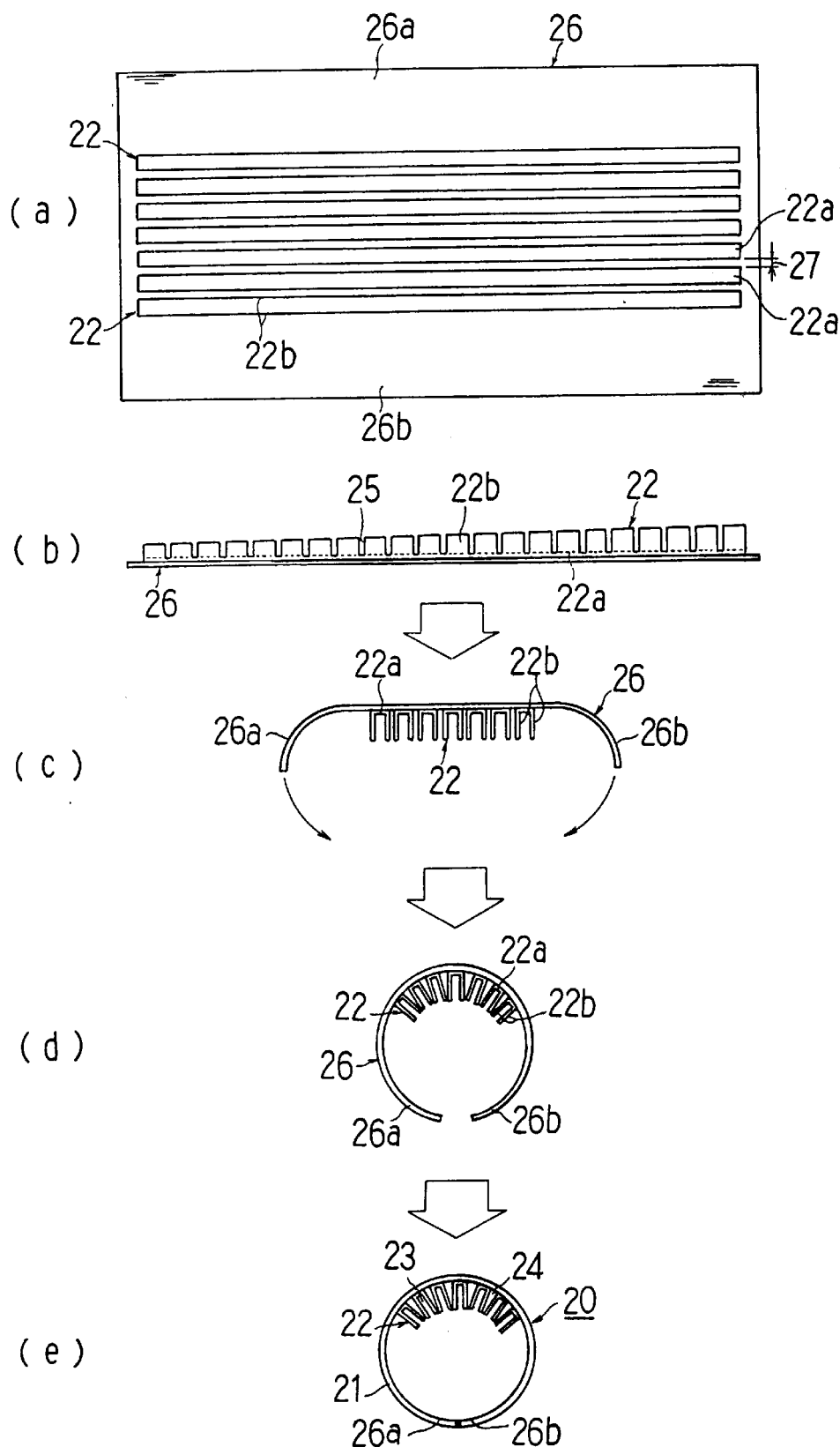
FIGS. 6(a)–6(e) are views showing one example of a process for manufacturing the exhaust pipe.
Figure 9:
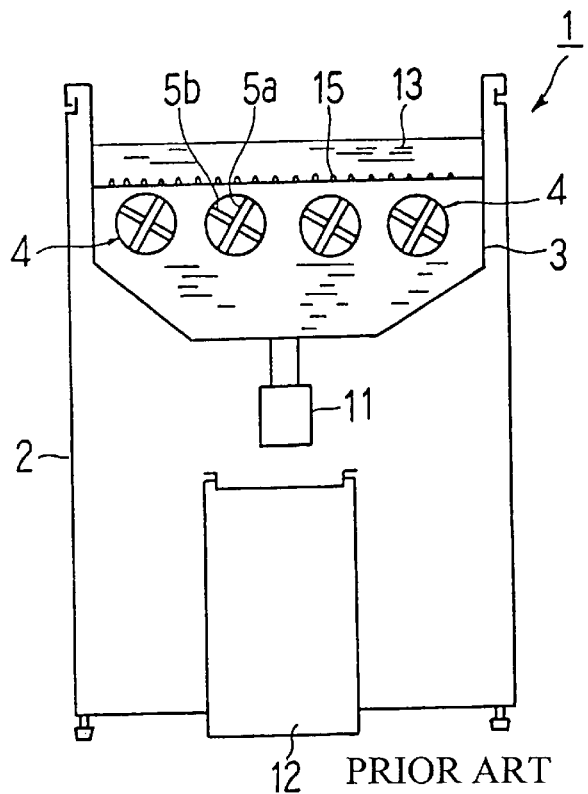
FIG. 9 is a sectional front view schematically showing a conventional liquid heating apparatus according to one embodiment.
Figure 10:
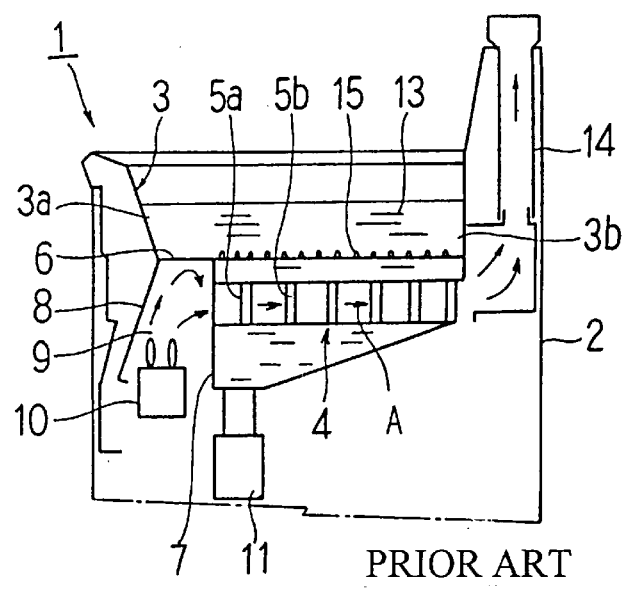
FIG. 10 is a sectional side view schematically showing principal parts of the conventional liquid heating apparatus.

FIG. 1 to FIG. 6 show a liquid heating apparatus according to one embodiment of the present invention: FIG. 1 is a sectional front view schematically showing the liquid heating apparatus according to one embodiment; FIG. 2 is a sectional side view schematically showing principal parts of the liquid heating apparatus; FIG. 3 is a view showing interior principal parts of an exhaust pipe of the liquid heating apparatus; FIG. 4 is a side view in partly section showing the exhaust pipe; FIG. 5 is a front view showing the exhaust pipe; and FIG. 6 is a view showing one example of a process for manufacturing the exhaust pipe. In these figures, like reference numerals are used to designate the same parts as those shown in FIG. 9 and FIG. 10, and the detailed description is omitted.

As shown in FIG. 1 and FIG. 2, in a fryer 1, an upper portion of a main body 2 is provided with a liquid bath 3, and a plurality of exhaust pipes 20 (four in FIG. 1) are located below a net 15 in the liquid bath 3. These exhaust pipes 20 extend from one end side 3a of the liquid bath 3 toward the other end side 3b thereof in a substantially horizontal state. The exhaust pipe 20 is composed of a stainless tubular member 21 having a circular cross section, and a copper fin 22 fixed to an inner surface of a substantially upper half portion in the cross section of the tubular member 21.

The fin 22 is formed into a shape of U-letter in its cross section as shown in FIG. 3 to FIG. 5. A fixture portion 22a of the fin 22 is fixed onto an inner surface of the tubular member 21 so that a pair of vertical walls 22b is oriented toward the center of the tubular member 21, and a slight gap is formed between the pair of vertical walls 22b at the distal end portion of their walls. Whereby a combustion gas flow passageway 23 is formed between the vertical walls 22b of each fin 22, and also, a combustion gas flow passageway 24 is formed between the vertical walls 22b of adjacent fins 22.

Moreover, the pair of vertical walls 22b of each fine 22 is formed with many notches 25 which arrives at the fixture portion 22a, at a predetermined interval in the longitudinal direction (constant interval or intervals gradually becoming wide and narrow). These notches 25 serve to prevent a warp of the fin 22. The vertical walls 22b of the fin 22 is formed so that their height is linearly made large.

More specifically, as shown in FIG. 4, in the fin 22, the vertical wall 22b on a combustion gas inlet side situated at the combustion chamber 9 side is formed so as to have a height h1 which is smaller than a height h2 of the vertical wall 22b on a combustion gas outlet side situated at the discharge cylinder 14 side; namely, a relation (h1<h2) is established. The height of the vertical wall 22b of the fin 22 is linearly varied, and besides, the fin 22 divided by each notch 25 may be stepwise varied in its height, and may be varied like a curve as a whole. The variation is determined in accordance with a temperature gradient in the longitudinal direction of the tubular member 21.

A plurality of fins 22 (seven in FIG. 5) are arranged on a circular upper side (upper half portion) of the tubular 21 so as to become symmetrical, and no fin is arranged on the lower portion thereof. The reason why the fin 22 is arranged on only upper portion is as follows. More specifically, the temperature in the tubular member 21 becomes high at the upper portion side (combustion gas also becomes a high temperature), and becomes low at the lower portion side (combustion gas also becomes a low temperature). Thus, the fin 22 is arranged on only upper portion in order to effectively transfer a heat of the high temperature combustion gas to the tubular member 21 by means of the fin 22.

The fin 22 is manufactured in a manner as shown in FIG. 6, for example. More specifically, first, in order to form the tubular member 21, a stainless plate 26 cut into a predetermined outer shape is prepared. As shown in FIG. 6(a) and FIG. 6(b), in accordance with a material quality of the plate 26 and the fin 22, seven fins 22 are fixed to a predetermined position on the surface of the plate 26 by proper means such as seam welding, brazing, high frequency welding or the like. In this case, these seven fins 22 are fixed in a manner that the fixture portions 22a of adjacent fins 22 have a predetermined interval 27.

These fins 22 are fixed to the plate 26, and thereafter, as shown in FIG. 6(c), opposite side 26a and 26b of the plate 26, to which the fin 22 is not fixed, is bent into a substantially circular shape with the use of a die (mold) having a proper shape, and then, is further bent. As shown in FIG. 6(d), end portions of opposite sides 26a and 26b of the plate 26 are made into a state of being approximately abutted against each other. Then, in this state, as shown in FIG. 6(e), end portions of opposite sides 26a and 26b of the plate 26 are fixedly welded by argon arc welding or the like.

In the manner as described above, an exhaust pipe 20 as shown in FIG. 3 and FIG. 4 is manufactured. In the case of manufacturing this exhaust pipe 20, in particular, when the plate 26 is bent, the fixture portions 22a of seven fins 22 are fixed onto the plate 26 at a predetermined interval 27. Therefore, the vertical walls 22b of the adjacent fins 22 have no interference with each other, and it is possible to readily bend the plate 26, to which the fin 22 is fixed, into a circular state, and thus, the exhaust pipe 20 can be readily manufactured.

The above embodiment shows one example of the manufacturing process (method). For example, the following manufacturing process may be properly employed. More specifically, opposite end portions 26a and 26b of the plate 26, to which no fin 22 is fixed, are previously bent into a state as shown in FIG. 6(c), and then, in this state, the fin 22 is fixed to the plate 26, and thereafter, the opposite end portions 26a and 26b of the plate 26 are further bent so as to be formed into a shape as shown in FIG. 6(d).

Next, an operation of the aforesaid fryer 1 will be described below with reference to FIG. 2 and FIG. 3. First, an oil 13 such as an edible oil is put in the liquid bath 3 as a predetermined amount of liquid, and then, a gas burner 10 such as a Bunsen gas burner is burned. A combustion gas generated by the combustion of the gas burner 10 directly heats the horizontal wall 6 of the liquid bath 3, and comes into the exhaust pipe 20 from an inlet of the exhaust pipe 20 so as to flow therethrough, and thus, is discharged from the discharge cylinder 14 to the outside. The combustion gas flowing through the exhaust pipe 20 flows through passageways 23 and 24 formed by the fins 22 as shown by arrows B and C in FIG. 3, and also, flows through portion having no fin 22 as shown by an arrow D in FIG. 2. In particular, a temperature of the fin 22 itself is made high by the combustion gas flowing through passageways 23 and 24 formed by the fins 22.

In that case, the fin 22 is formed into a U-letter shape in its cross section so that its heating surface area is largely set, and therefore, the vertical wall 22b of the fin 22 is heated by the combustion gas, so that the temperature of the fin 22 can be effectively made high. As a result, a heat of the fin 22 is transferred to the tubular member 21 via the fixture portion 22a so as to heat the tubular member 21. Then, the tubular member 21 is heated, and thereby, the oil 13 contacting with an outer peripheral surface of the tubular member 21 is heated to a predetermined temperature. Further, the heating surface area of the fin 22 is set in accordance with a temperature gradient, and therefore, the oil 13 becomes a substantially uniform temperature in the overall region of the liquid bath 3. As a result, it is possible to preferably and effectively fry a food by the oil 13.

As described above, in the fryer 1 of the above embodiment, a plurality of fins 22 are longitudinally fixed to the inner surface of the exhaust pipe 20 located in the liquid bath 3. Thus, by the vertical wall 22b of the fin 22, the exhaust pipe 20 has a heating surface area of about 3 to 5 times as much as the case where the exhaust pipe has no fin 22 of the above embodiment. Further, a heat (temperature) of the combustion gas flowing through the exhaust pipe 20 is preferably transferred to the exhaust pipe 20 via the fin 22. As a result, it is possible to heat the oil 13 in the liquid bath 3 to a predetermined temperature by the exhaust pipe 20 for a short time, and this, to greatly improve its heating efficiency.

Further, the longitudinal height of the fin 22 is set so as to become gradually higher from the inlet side toward the outlet side, and therefore, this serves to make large a heating surface area on the outlet side where the combustion gas temperature is low. As a result, it is possible to obtain a heating surface area in response to a temperature gradient of the exhaust pipe 20, and to further improve a heating efficiency of the combustion gas to the exhaust pipe 20, and thus, to obtain a sufficient heat transfer efficiency. Whereby it is possible to make small a longitudinal temperature difference in the liquid bath 3, and thus, to make uniform the temperature of oil 13 in the liquid bath 3.

Further, the fin 22 is located on only upper side which is a high temperature side passageway of the tubular member 21, and therefore, the fins 22 are effectively arranged so as to reduce the number of fins 22 as much as possible. This serves to simplify a construction of the exhaust pipe 20. In addition, the fin 22 is located on only upper portion of the inner surface of the tubular member 21, and therefore, the exhaust pipe 20 is readily manufactured as described before. As a result, it is possible to achieve a cost reduction of the exhaust pipe 20.

Furthermore, the fin 22 is formed with the notch 25 which arrives at the fixture portion 22a, at a predetermined interval in the longitudinal direction thereof, and therefore, it is possible to securely prevent a warp of the fin 22 by the heat of combustion gas, and thus, to stably keep a shape of the exhaust pipe 20 for a long time. As a result, a reliability of the fryer 1 can be improved. In addition, the fin 22 is located on the exhaust pipe 20 forming a heat exchange section, and thereby, a heat loss is prevented in the exhaust pipe 20 section. Thus, there is no need of making large an outer dimension of the exhaust pipe 20. As a result, it is possible to readily carry out a cleaning work.

Figure 7:
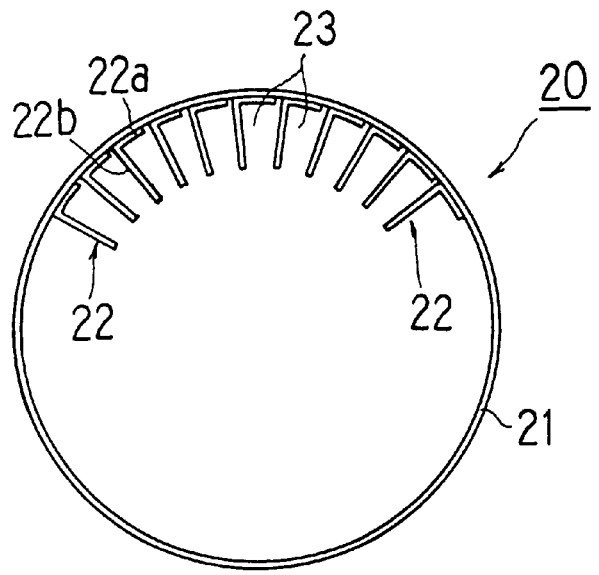
FIG. 7 is a front view showing an modification example of a fin of the exhaust pipe shown in FIG. 5.
Figure 8:
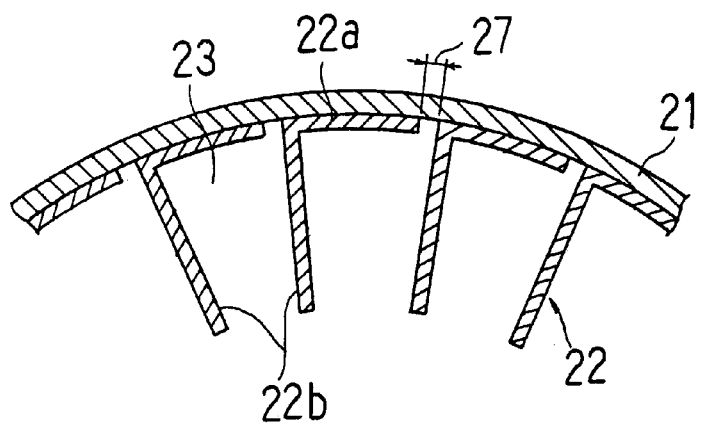
FIG. 8 is an enlarged sectional view showing principal parts of the fin.

FIG. 7 and FIG. 8 show a modification example of the fin described in the above embodiment. A fin 22 is formed into a L-letter shape in its cross section, and has a fixture portion 22a and one vertical wall 22b. The fixture portion 22a is fixed onto an inner surface of the tubular member 21 of the exhaust pipe 20. A flow passageway 23 is formed between the vertical walls 22b of the adjacent fins 22, and the fin 22 is fixed to the tubular member 21 at a predetermined interval 27. Thus, the exhaust pipe 20 is readily manufactured; therefore, it is possible to obtain the same effect as the fin 22 described in the above embodiment.

The above embodiment has described the case where the fin 22 is located to the upper portion side on the inner surface of the tubular member 21. The present invention is not limited to the aforesaid embodiment, and the fin 22 may be located on a side slightly lower than the upper portion of the inner surface of the tubular member 21, or may be located over the entire circumference of the inner surface of the tubular member 21. Moreover, in the above embodiment, seven fins 22 have been arranged, and these all fins 22 have been formed into the same shape. For example, a plurality of fins 22 having a different length may be arranged, and the number, width, length of the fins 22 and the number of notches 25 and a shape are not limited to the above embodiment.

In the liquid heating apparatus of the present invention, the U-letter shaped fin 22 and the L-letter shaped fin 22 in its cross section may be fixed side by side. The liquid heating apparatus of the present invention is limited to the fryer 1, and is applicable to various liquid heating apparatuses for heating a predetermined liquid, for example, to a noodle boiling machine. Further, in the above embodiment, four exhaust pipes 20 have been located in the liquid bath 3. The number of the exhaust pipes is not limited to four, and may be increased or decreased in accordance with a size (volume) of the liquid bath 3. Furthermore, the shape of the liquid bath 3, a type of the gas burner 10 and its locating position are merely shown as one example, and therefore, various changes and modifications are possible in a scope without departing from the gist of the present invention.

As is evident from the above description, according to the invention defined in the first aspect (claim 1), the fins are integrally located on the inner surface of the exhaust pipe arranged in the liquid bath. Therefore, by the fins, it is possible to greatly make large a heating surface area of the combustion gas heat with respect to the exhaust pipe, and to effectively heat a liquid in the liquid bath, and thus, to obtain a sufficient heat efficiency.

Further, according to the invention defined in the second aspect (claim 2), in addition to the effect of the invention defined in the first aspect, the heating surface area of the fin is set in accordance with a temperature gradient of the combustion gas flowing through the exhaust pipe. Therefore, it is possible to effectively transfer a heat (temperature) of the combustion gas to the exhaust pipe via the fin, and thus, to obtain a sufficient heat efficiency.

Further, according to the invention defined in the third aspect (claim 3), in addition to the effect of the invention defined in the first or second aspect, the fin is located on only upper portion of the inner surface of the exhaust pipe on the side of the high temperature section of the liquid bath. Therefore, it is possible to reduce the number of fins, and to simplify a construction of the exhaust pipe.

Further, according to the invention defined in the fourth or fifth aspect (claim 4 or claim 5), in addition to the effect of the invention defined in the first to third aspects, the fin has a U-letter or L-letter shape in its cross section, and the fixture portion of the fin is fixed to the inner surface of the exhaust pipe at a predetermined interval. Therefore, for example, in the case of manufacturing the exhaust pipe, the exhaust pipe is simply manufactured by bending a flat-like plate, to which the fins are fixed, into a circular shape, so that the exhaust pipe can be readily manufactured.

What is claimed is:

1. A liquid heating apparatus including: a liquid bath; a combustion chamber which is provided with a burner and is formed at one side on a lower portion of the liquid bath; and at least one exhaust pipe which is located in a substantially horizontal state at an intermediate portion of the liquid bath and extends from one side of the liquid bath toward the other side thereof for heating a liquid in the liquid bath by passing a combustion gas generated in the combustion chamber into the exhaust pipe, said exhaust pipe being separate from and downstream of both said combustion chamber and said burner, wherein a fin is integrally located on an inner surface of the exhaust pipe along a longitudinal direction thereof.

2. The liquid heating apparatus according to claim 1, wherein the fin has a heating surface area which is set in accordance with a temperature gradient in a longitudinal direction of the exhaust pipe.

3. The liquid heating apparatus according to claim 1, wherein the fin is located on only upper portion side on an inner surface of the exhaust pipe.

4. The liquid heating apparatus according to claim 1, wherein the fin is formed into a U-letter shape in its cross section, and is fixed to the inner surface of the exhaust pipe so that a fixture portion of the fin has a predetermined interval.

5. The liquid heating apparatus according to claim 1, wherein the fin is formed into an L-letter shape in its cross section, and a fixture portion of the fin is fixed to the inner surface of the exhaust pipe.

* * * * *

UNITED STATES PATENT AND TRADEMARK OFFICE
CERTIFICATE OF CORRECTION

PATENT NO. : 6,192,880 B1
DATED : February 27, 2001
INVENTOR(S) : Toshio Furuhashi It is certified that error appears in the above-identified patent and that said Letters Patent is hereby corrected as shown below:

Title page,
Under U.S. Patent Documents, reference 4,628,903 "Farmsworth et al" should be -- Farnsworth et al --.

Title page,
Abstract,
Line 12, "bypassing" should be -- by passing --.

Column 1,
Line 37, "man" should be -- main --.
Line 65, after "effectively" insert -- heat --.

Column 2,
Line 12, "generate" should be -- generated --.

Column 3,
Line 35, "bent" should be -- bend --.
Line 53, "an" should be -- a --.

Column 4,
Line 35, "fine" should be -- fin --

Signed and Sealed this

Sixteenth Day of October, 2001

*Attest:*

NICHOLAS P. GODICI
*Attesting Officer*    *Acting Director of the United States Patent and Trademark Office*